(12) United States Patent
Iwasaki et al.

(10) Patent No.: US 7,813,767 B2
(45) Date of Patent: Oct. 12, 2010

(54) MOBILE TERMINAL APPARATUS

(75) Inventors: Hidetoshi Iwasaki, Kawasaki (JP);
Mitsuru Hanada, Kawasaki (JP);
Takahiro Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 11/847,756

(22) Filed: Aug. 30, 2007

(65) Prior Publication Data
US 2008/0076481 A1    Mar. 27, 2008

(30) Foreign Application Priority Data
Sep. 22, 2006    (JP) .............................. 2006-256940

(51) Int. Cl.
*H04M 1/00* (2006.01)

(52) U.S. Cl. .................. 455/566; 455/575.4; 455/575.1

(58) Field of Classification Search ................. 455/566, 455/575.1, 575.3, 575.4, 550.1, 90.3; 379/433.01, 379/433.04, 433.12, 433.13
See application file for complete search history.

(56) References Cited

U.S. PATENT DOCUMENTS

| | | | |
|---|---|---|---|
| 7,200,429 B2 * | 4/2007 | Park et al. ................. | 455/575.4 |
| 7,492,893 B2 * | 2/2009 | Ahn et al. ............... | 379/433.13 |
| 7,529,571 B2 * | 5/2009 | Byun et al. ............... | 455/575.4 |
| 7,577,466 B2 * | 8/2009 | Kim ........................ | 455/575.4 |
| 2004/0203527 A1 * | 10/2004 | Matsumoto ................ | 455/90.3 |
| 2009/0058882 A1 * | 3/2009 | Adachi et al. ............... | 345/650 |
| 2009/0298550 A1 * | 12/2009 | Kang et al. ................. | 455/566 |

FOREIGN PATENT DOCUMENTS

| | | |
|---|---|---|
| JP | 7-319447 A | 12/1995 |
| JP | 11-109885 A | 4/1999 |
| JP | 2002-341857 A | 11/2002 |
| JP | 2004-184560 A | 7/2004 |

* cited by examiner

*Primary Examiner*—Sonny Trinh
(74) *Attorney, Agent, or Firm*—Westerman, Hattori, Daniels & Adrian, LLP

(57) ABSTRACT

To provide a mobile terminal apparatus for displaying an image by selecting the optimum display screen without adding a special process to a program operating on the mobile terminal apparatus, a mobile terminal apparatus 100 includes a program execution unit 102 for executing a desired program and output display information, a direction detection unit 103 for detecting the direction of a display screen 106, a display information conversion unit 104 for converting display information on the basis of the direction of the display screen 106, the size of the display information, etc., and a display processing unit 105 for displaying the display information on the display screen 106.

20 Claims, 12 Drawing Sheets

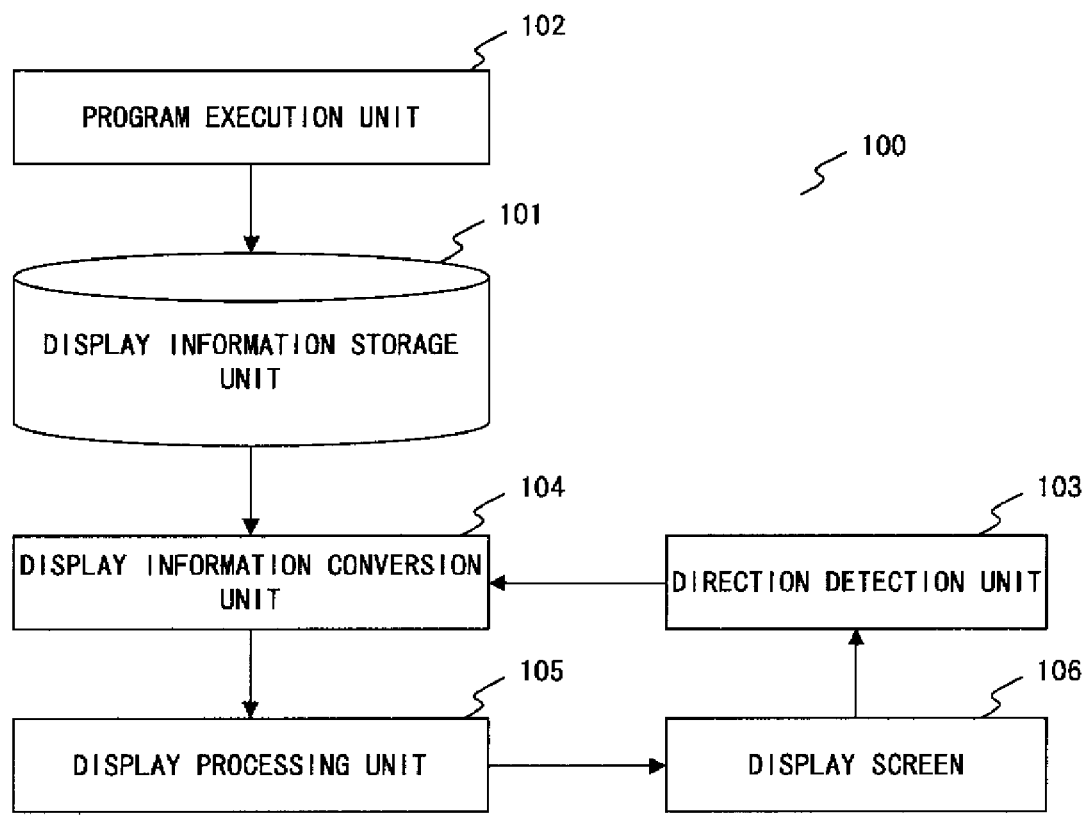
F I G. 1

| PROGRAM NAME | ONE-TOUCH ACTIVATION | STATUS AT REGISTRATION |
|---|---|---|
| APPLICATION 1 | ○ | LANDSCAPE STATE |
| APPLICATION 2 | | |
| APPLICATION 3 | ○ | PORTRAIT STATE |

400

APPLICATION 1 → ONE-TOUCH ACTIVATION APPLICATION IN LANDSCAPE STATE
APPLICATION 2 → ONE-TOUCH ACTIVATION APPLICATION IN PORTRAIT STATE

F I G. 4

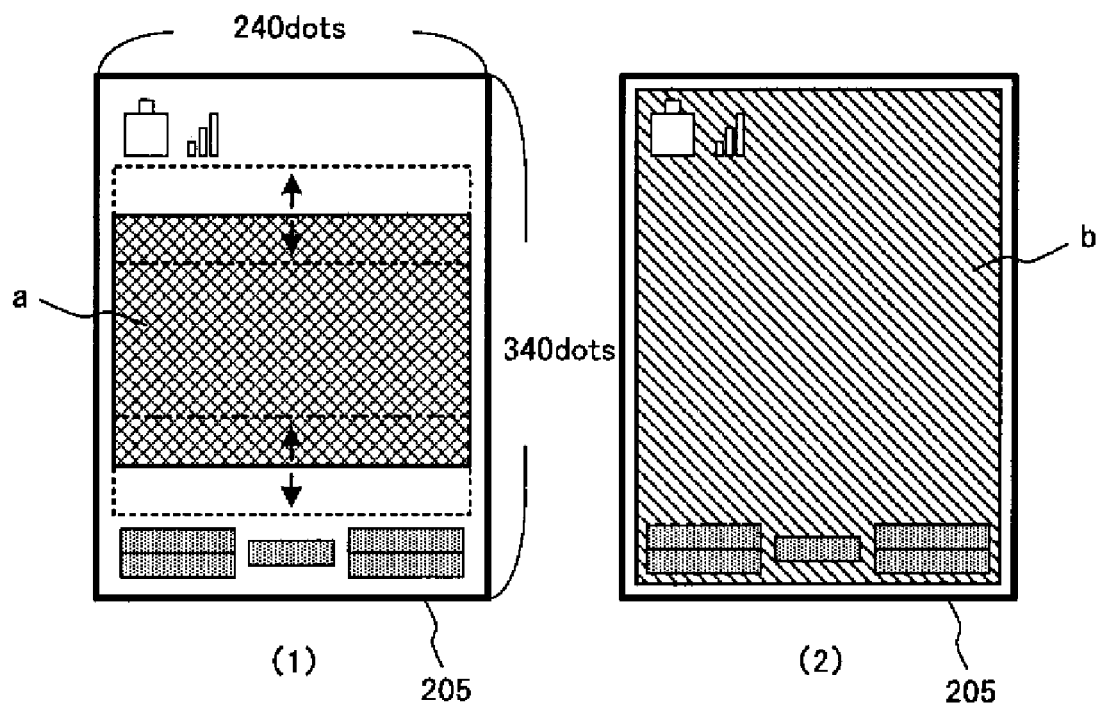
F I G. 5

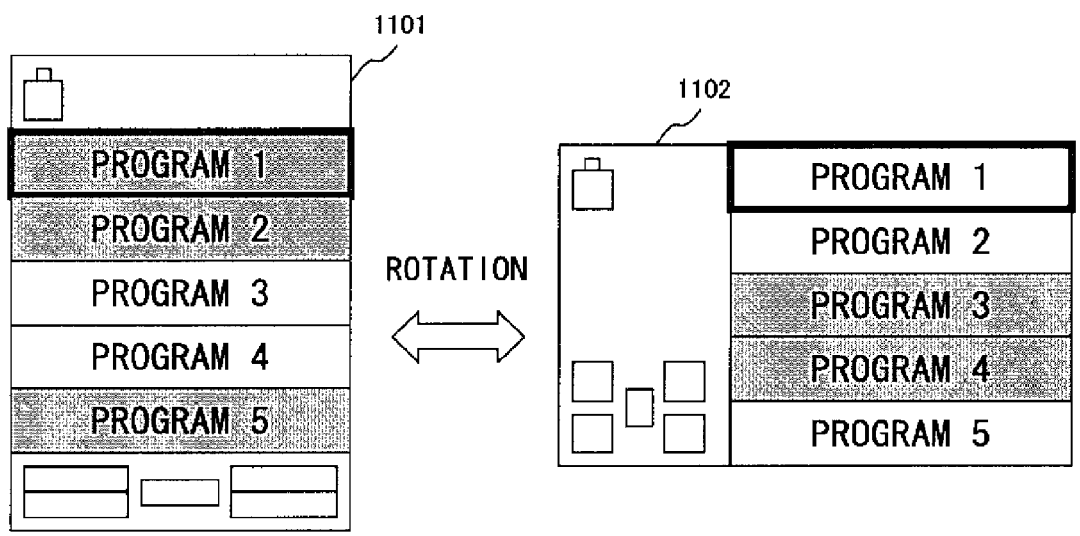
F I G. 11

MOBILE TERMINAL APPARATUS

BACKGROUND OF THE INVENTION

1. Field of the Invention

The present invention relates to a mobile terminal apparatus having a display unit capable of displaying desired information.

2. Description of the Related Art

A display provided for a conventional mobile terminal apparatus is generally a portrait use screen (portrait screen). In this case, for example, a program of a game etc. operating on the mobile terminal apparatus generates display information in accordance with the portrait screen.

With an increasing number of recent multi-function devices, a mobile terminal apparatus can be loaded with the Internet and the functions of games, TV, etc., and the portrait screen of the apparatus is often used as a landscape screen by rotating its portrait screen by 90°. In this case, for example, a game operated on a mobile terminal and a program for watching TV generate display information for the landscape screen.

However, in the mobile terminal apparatus for use with the portrait screen as a display screen, when the display screen is used as a landscape screen, it is necessary to implement in the program the process of rotating the display information by 90° (270°).

Therefore, it is not possible to appropriate display data on the display screen without changing the program. As a result, it is difficult to perform the process of changing the range of drawings on the display screen during drawing pictures on the display screen.

Japanese Published Patent Application No. H07-319447 discloses an image display method and an image processing device capable of adjusting the size and the direction of an image to be displayed and displaying the image on the screen of the display device.

The Japanese Published Patent Application No. H11-109885 discloses an image display device capable of discriminating whether or not the posture of a liquid crystal panel matches the posture of the image on the basis of image data, drive-controlling the rotation mechanism when a non-matching result is output, and making the postures match each other, thereby displaying the entire image.

Japanese Published Patent Application No. 2002-341857 discloses an image display device capable of improving the visibility by suppressing the distortion of an image displayed on the screen to the lowest possible level by performing a rotation process on the image when the screen and the image is different in longitudinal direction.

Japanese Published Patent Application No. 2004-184560 discloses a display device capable of automatically rotating the display screen to change to the portrait state or the landscape state depending on the operation for portrait display or landscape display on the image output device side.

SUMMARY OF THE INVENTION

The present invention has been developed to solve the above-mentioned problems, and aims at providing a mobile terminal apparatus for performing optimum display depending on the status of the display screen without adding a special process to the program operating on the mobile terminal apparatus.

To solve the above-mentioned problem, the mobile terminal apparatus according to the present invention to which a display unit for displaying desired display information is connected as a rotatable unit includes: a program execution unit for executing a desired program, and storing, in a display information storage unit, display information output as a result of the executing; a direction detection unit for detecting the direction of the display unit with respect to the body of the mobile terminal apparatus; a display information conversion unit for rotating the display information stored in the display information storage unit in a desired direction depending on the direction of the display unit detected by the direction detection unit, and the size of the display information generated by the program; and a display processing unit for reading the display information from the display information storage unit and outputting display information to the display unit.

According to the present invention, the display information conversion unit rotates display information in a desired direction depending on the direction of the display unit and the size of the display information, and the display processing unit displays the rotated display information on the display unit. Therefore, the display information can be displayed in the optimum state independent of the process of the program.

As described above, the present invention can provide a mobile terminal apparatus capable of performing optimum display on the basis of the state of the display screen without adding a special process to a program operating on the mobile terminal apparatus.

BRIEF DESCRIPTION OF THE DRAWINGS

FIG. 1 is an explanatory view showing the principle of the mobile terminal apparatus according to an embodiment of the present invention;

FIG. 4 shows an example of the shortcut control information according to an embodiment of the present invention;

FIG. 5 is an explanatory view showing the relationship between the display area of the LCD and the buffer according to an embodiment of the present invention;

FIG. 11 shows an example of displaying a list of programs by the list display unit according to an embodiment of the present invention.

DESCRIPTION OF THE PREFERRED EMBODIMENTS

Figure 2:
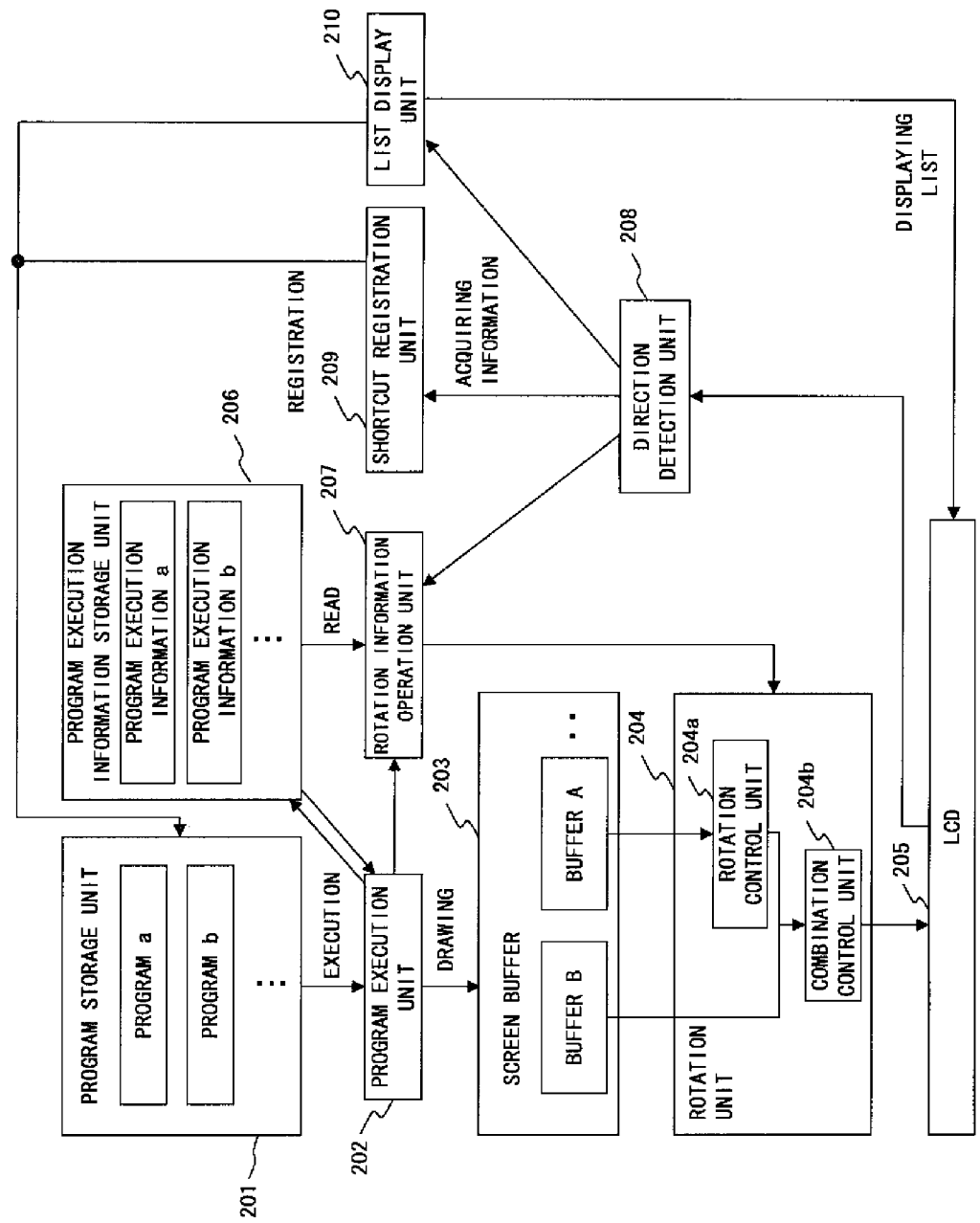
FIG. 2 shows an example of the practical configuration of the mobile terminal apparatus according to an embodiment of the present invention.

The embodiments of the present invention are described below by referring to FIGS. 1 through 12.

FIG. 1 is an explanatory view showing the principle of the operation of a mobile terminal apparatus 100 according to an embodiment of the present invention.

The mobile terminal apparatus 100 shown in FIG. 1 includes: a program execution unit 102 for executing a desired program and outputting display information to a display information storage unit 101; a direction detection unit 103 for detecting the direction of a display screen 106 (hereinafter referred to as a "display screen direction"); a display information conversion unit 104 for rotating display information depending on the display screen direction etc.; a display processing unit 105 for displaying the display information generated by the execution of the program on a display screen 106; and a display screen 106 connected to the body of the mobile terminal apparatus 100 so that they can be rotated with respect to each other in the display screen direction.

The program execution unit 102 executes a desired program such as an application for a game, display of moving pictures, etc., and stores display information output as a result of the execution in the display information storage unit 101.

The direction detection unit 103 detects a display screen direction. The "display screen direction" refers to the direction (position) of the display screen 106 when the display information is displayed, and it is determined on the basis of the position (angle) of the display screen 106 with respect to the body of the mobile terminal apparatus 100.

For example, when the display screen 106 which is rectangular is portrait positioned with respect to the body of the mobile terminal apparatus 100, it is determined that the display screen direction is "portrait direction". (hereinafter, the display screen 106 at this time is referred to as a "portrait screen".) And, when the display screen 106 which is rectangular is landscape positioned with respect to the body of the mobile terminal apparatus 100, it is determined that the display screen direction is "landscape direction". (hereinafter, the display screen 106 at this time is referred to as a "landscape screen".)

The display information conversion unit 104 acquires the size of the display information from the program to be executed not shown in the attached drawings or the program execution information for definition of the program execution condition, etc. Then, it rotates the display information on the basis of the size of the display information and the display screen direction.

"To rotate the display information" refers to converting the display information such that the image of the display information displayed on the display screen 106 can be rotated by predetermined degrees.

FIG. 2 shows an example of a practical configuration of the mobile terminal apparatus 100 according to an embodiment of the present invention.

The mobile terminal apparatus 100 shown in FIG. 2 is provided with at least a program storage unit 201 for storing a program, a program execution unit 202 for executing the program, a screen buffer 203 for storing display information output by executing the program, a rotation unit 204 for converting the display information on the basis of the instruction of a rotation information operation unit 207 and outputting a result of the conversion to an LCD (liquid crystal display) 205, the LCD 205 connected such that the display can be rotated with respect to the body of the mobile terminal apparatus 100, a program execution information storage unit 206 for storing program execution information, the rotation information operation unit 207 for instructing the rotation unit 204 to convert the display information on the basis of the program execution information etc., and a direction detection unit 208 for detecting a display screen direction.

With the above-mentioned configuration, program execution information a, program execution information b, program execution information n stored in the program execution information storage unit 206 are information for definition of the sizes of the display information generated respectively by a program a, a program b, . . . , and a program n stored in the program storage unit 201.

The program execution unit 202 reads a desired program from the program storage unit 201 and executes it. Then the unit reads program execution information from the program execution information storage unit 206, dynamically generates the display information about the size defined by the program execution information, and outputs the information to the screen buffer 203.

The program execution unit 202 changes the program execution information on the basis of the program instruction to be executed and notifies the rotation information operation unit 207 of the change. As a result, the screen size can be dynamically changed.

The screen buffer 203 is provided with buffers A and B. In the present embodiment, the display information to be displayed in a program display area is stored in the buffer A, and the display information to be displayed in a system display area is stored in the buffer B.

The rotation unit 204 acquires the display information stored in each buffer of the screen buffer 203, and changes the display information to be rotated by 90° (270°) as necessary. Then, it combines display information and outputs the result to the LCD 205.

The rotation unit 204 according to the present embodiment is provided with a rotation control unit 204a for rotating the display information and a combination control unit 204b for combining display information and outputting the result to the LCD 205.

The rotation control unit 204a rotates the display information acquired from the buffer A of the screen buffer 203 at an instruction from the rotation information operation unit 207. Since the rotation information operation unit 207 according to the present embodiment issues an instruction to rotate the display information by 90° (270°) as necessary, the rotation control unit 204a rotates the display information by 90° (270°) at the instruction.

The combination control unit 204b combines the display information in the buffers A with the display information in the buffer B and outputs the result to the LCD 205. The LCD 205 has a display area of 320 dots long and 240 dots wide.

The rotation information operation unit 207 reads the program execution information of the program executed by the program execution unit 202 from the program execution information storage unit 206, and acquires the size of the display information generated by executing the program.

Furthermore, when the rotation information operation unit 207 receives a change notification about the program execution information from the program execution unit 202, it reads the program execution information again and acquires the size of the display information.

Figure 3:
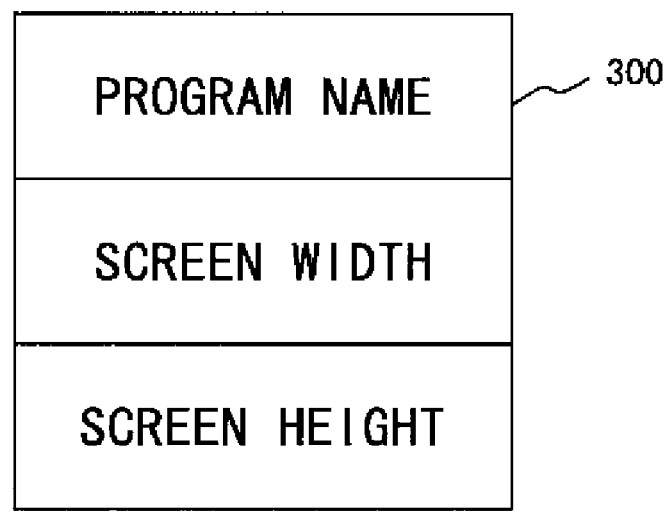
FIG. 3 shows an example of the program execution information according to an embodiment of the present invention.

As shown in FIG. 3, program execution information 300 has the information about a program name, a screen width, and a screen height. For example, the size information about, for example, 240 dots, 320 dots, etc. is set as the screen width and the screen height. The program generates the display information that can be displayed in the display area formed by the screen width and the screen height.

Furthermore, the rotation information operation unit 207 acquires the display screen direction from the direction detection unit 208. Then, it instructs the rotation unit 204 to rotate the display information by 90° (270°) on the basis of the size of the display information and the display screen direction.

The direction detection unit 208 detects the display screen direction of the LCD 205, and notifies the rotation information operation unit 207 etc. of the direction. The direction detection unit 208 according to the present embodiment detects the position of the LCD 205 for every 90°, and detects whether the LCD 205 is set in the portrait direction or the landscape direction.

As described above, in the present embodiment, when the LCD 205 is portrait positioned with respect to the body of the mobile terminal apparatus 100, it is determined that the display screen direction is the "portrait direction", and the screen of the LCD 205 is a "portrait screen". Similarly, when the LCD 205 is landscape positioned with respect to the body of the mobile terminal apparatus 100, it is determined that the display screen direction is a "landscape direction", and the screen of the LCD 205 is a "landscape screen".

The mobile terminal apparatus 100 according to the present embodiment further includes a shortcut registration unit 209 for assigning a shortcut button to each program, and a list display unit 210 for listing programs as identified and executable depending on a display screen direction.

The shortcut registration unit 209 registers a shortcut key specified for each program stored in the program storage unit 201. For example, if a user specifies a program and its shortcut key in a predetermined operation, then the mobile terminal apparatus 100 registers the program and the shortcut key in the shortcut registration information.

At this time, the shortcut registration unit 209 acquires the display screen direction from the direction detection unit 208, and registers the status at the registration in a shortcut control information 400.

As shown in FIG. 4, the shortcut control information 400 is provided with a program name, the information as to whether or not one-touch activation can be performed, and the information about the status at the registration. The o shown in FIG. 4 indicates that the one-touch activation can be performed using a shortcut key. Since the one-touch activation can be applied to the program registered in the shortcut registration information by pressing the shortcut key, the one-touch activation is automatically set for the program.

When a user presses the shortcut key for a process, the mobile terminal apparatus 100 refers to the shortcut control information 400, and acquires the status at the registration. If the status at the registration is a portrait state, a program corresponding to the portrait screen only is executed. If the status at the registration is a landscape state, a program corresponding to the landscape screen only is executed.

The list display unit 210 displays a list of programs stored in the program storage unit 201 on the LCD 205. For example, the list display unit 210 acquires the display screen direction from the direction detection unit 208, reads the program execution information from the program execution information storage unit 206, and determines the display screen direction in which the program can be displayed. Then, the program that can be displayed in the acquired display screen direction is highlighted. As a result, the program appropriate for the display screen direction can be easily recognized.

In the present embodiment described above, two buffers A and B are used. But, three or more buffers can be used as necessary. Although only the display information in the buffer A is rotated by the rotation control unit 204*a*, a plurality of buffers can be rotated as necessary.

The LCD 205 according to the present embodiment uses a display area of 320 dots long and 240 dots wide, the present invention is not limited to this size. Furthermore, although the LCD 205 is used for the display screen 106, the present invention is not limited to this application. For example, an organic EL (electro-luminescence) etc. can also be used.

FIG. 5 is an explanatory view showing the relationship between the display area of the LCD 205 and the buffer in the embodiment of the present invention.

The display area of the LCD 205 according to the present embodiment has a layer configuration of the program display area a for displaying the display information generated by the program execution unit 202, and the system display area b for displaying the system information about the mobile terminal apparatus 100 such as the capacity of a battery, a menu button, etc.

As shown in (1), the program display area a is an area in which a program can be arbitrarily set. Since the LCD 205 according to the present embodiment has a display area of 320 dots long and 240 dots wide, a display area of an arbitrary size equal to or smaller than 320 dots long and 240 dots wide can be set.

As shown in (2), the system display area b is a fixed display area. Since the entire screen of the LCD 205 is the system display area b in the present embodiment, it is a display area of 320 dots long and 240 dots wide.

The display information displayed in the program display area a is stored in the buffer A, and the display information displayed in the system display area b is stored in the buffer B.

Figure 6:
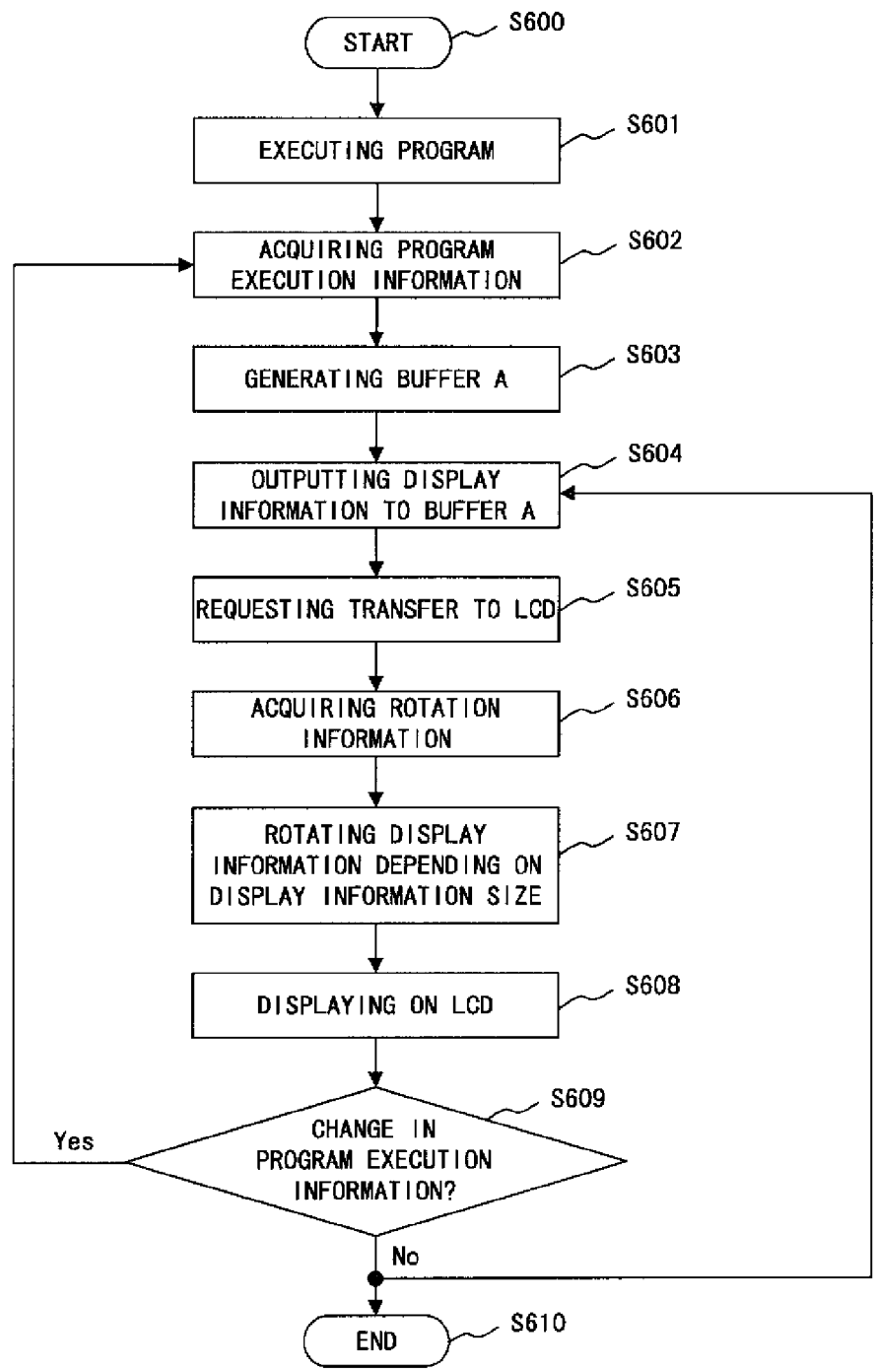
FIG. 6 is a flowchart showing the outline of the process of the mobile terminal apparatus according to an embodiment of the present invention.

FIG. 6 is a flowchart showing the outline of the process of the mobile terminal apparatus 100 according to an embodiment of the present invention.

When a predetermined operation is detected by a user, the mobile terminal apparatus 100 starts executing a specified program.

In step S601, the program execution unit 202 reads the specified program from the program storage unit 201, and starts the execution.

In step S602, the program execution unit 202 reads the program execution information about the program to be executed in step S601 from the program execution information storage unit 206, and acquires the size of the screen buffer in which the display information is stored.

In step S603, the program execution unit 202 generates the buffer A of the size acquired in step S602 in the storage area (screen buffer 203) in the mobile terminal apparatus 100. Then, control is passed to step S604, and the display information output by the execution of the program is output to (drawn in) the buffer A.

In step S605, at an instruction of the program being executed, the program execution unit 202 requests the screen buffer 203 to transfer the display information output to the buffer A to the LCD 205.

In step S606, the direction detection unit 208 acquires the rotation information about the LCD 205. The rotation information is the degree of the rotation from a predetermined position of the LCD 205. The direction detection unit 208 acquires the display screen direction from the rotation information and notifies the rotation information operation unit 207 of the direction.

In step S607, the rotation information operation unit 207 instructs the rotation unit 204 to rotate the display information as necessary. The rotation unit 204 rotates the display information at the instruction from the rotation information operation unit 207.

When the rotation process of the display information is completed, the rotation unit 204 passes control to step S608, outputs the display information to the 205, and displays it thereon.

In step S609, when there is any change in program execution information, for example, when the rotation information operation unit 207 receives a change notification about the program execution information from the program execution unit 202, the rotation information operation unit 207 passes control to step S602. Then, it reads the program execution information, and changes the size of the buffer A.

In step S609, when there is no change in program execution information, the processes in steps S604 through S609 are performed until the program is completely executed. When the program is completely executed, control is passed to step S610, and the process terminates.

Figure 7:
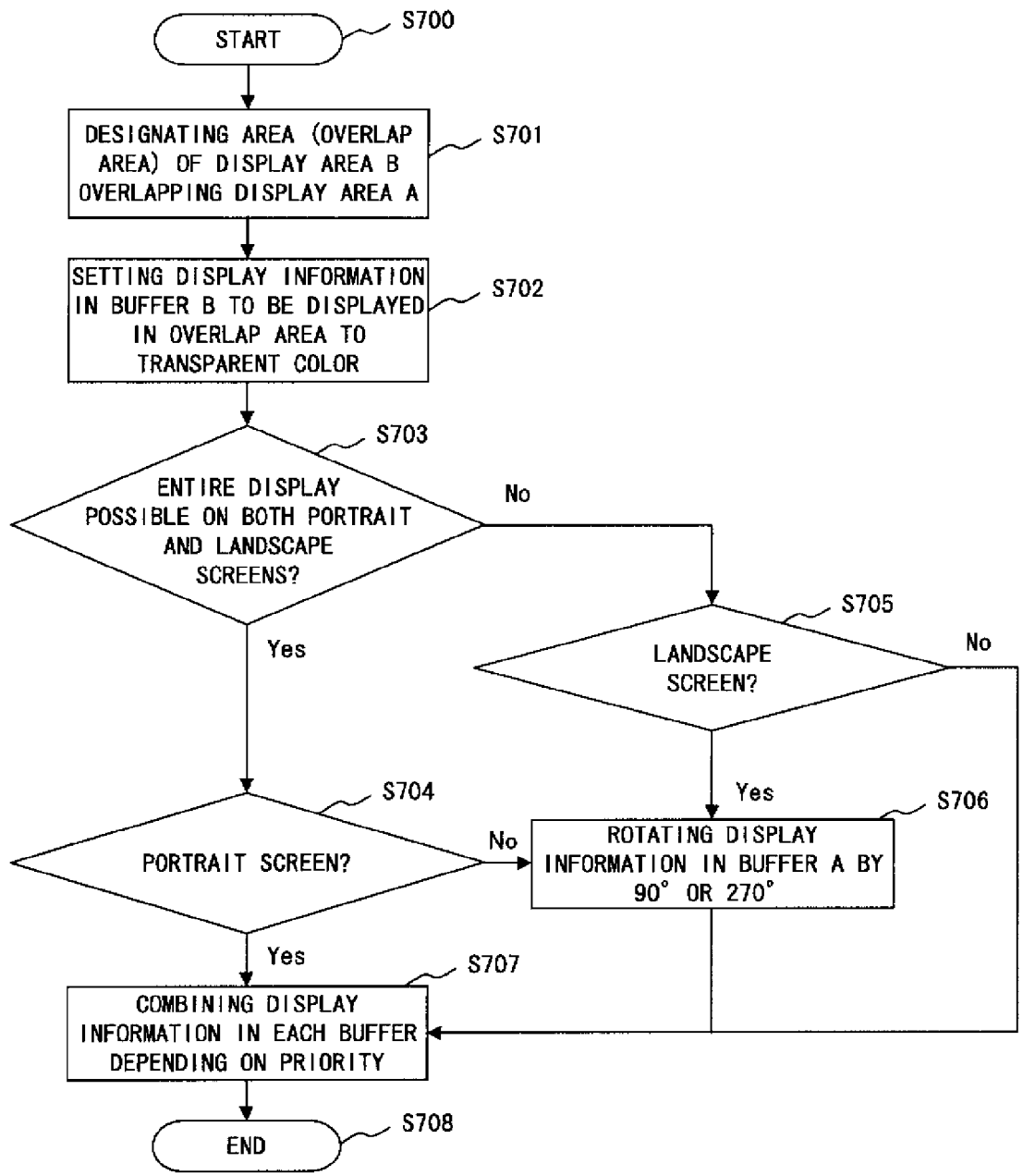
FIG. 7 is a flowchart showing an example of a practical process of the rotation process (step S607) according to an embodiment of the present invention.

FIG. 7 is a flowchart showing an example of a practical process of the rotation process (step S607) according to the embodiment of the present invention.

In step S701, the rotation unit 204 designates an area of the system display area b overlapping the program display area a (hereinafter referred to as an "overlap area"). In step S702, the display information in the buffer B displayed in the overlap area is set to a transparent color.

In step S703, the rotation information operation unit 207 compares the size of the display information with the size of the LCD 205 to check whether or not the entire image can be displayed in a normal position on either the portrait screen or the landscape screen.

The "entire image displayed in a normal position" refers to displaying the display information on the basis of the definition of the program execution information.

In the present embodiment, the long side of the display information (that is, the screen width of the program display area a) is compared with the short side of the display area of the LCD 205.

Figure 8:
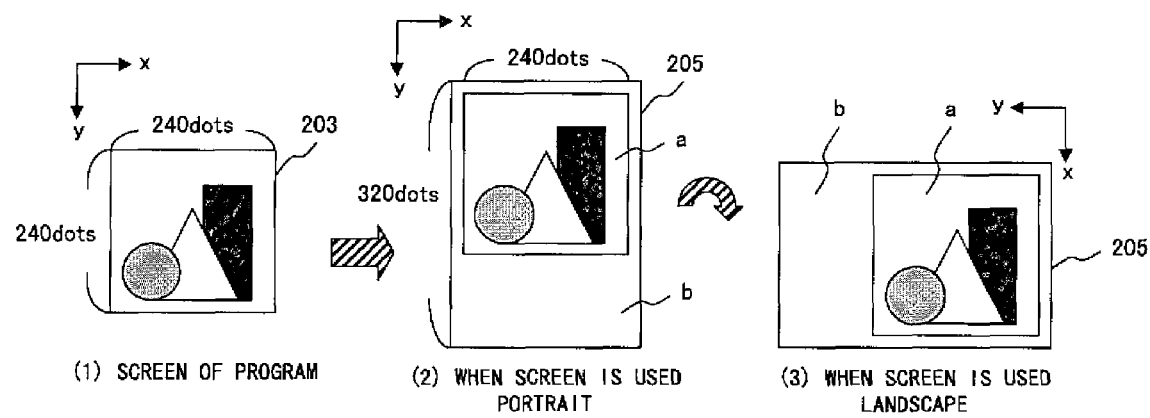
FIG. 8 shows an example of the display when the long side of a program display area is equal to or shorter than the short side of the display area of the LCD.

Then, when the long side of the display information is equal to or shorter than the short side of the display area of the LCD 205 (for example, in the case of the display information shown in FIG. 8), it is determined by the rotation of the display information in the buffer A that the entire image can be displayed in a normal position in either the portrait screen or the landscape screen, and control is passed to step S704.

In step S704, the rotation information operation unit 207 acquires the display screen direction of the LCD 205 from the direction detection unit 208. When the LCD 205 indicates the portrait screen (for example, the case of (2) shown in FIG. 8), the rotation information operation unit 207 passes control to the process in step S707 without rotating the display information.

When the LCD 205 is a landscape screen (for example, the case (3) shown in FIG. 8), the rotation information operation unit 207 passes control to step S706. Then, the rotation information operation unit 207 instructs the rotation unit 204 to rotate the display information by 270° (90°) in the buffer A, and control is passed to step S707.

In step S703, when the long side of the display information is longer than the short side of the display area of the LCD 205, the rotation information operation unit 207 passes control to the process in step S705.

In step S705, the rotation information operation unit 207 checks whether or not the display information in the buffer A is displayed on the landscape screen. For example, when screen width of the display information is longer than the short side of the display area of the LCD 205 (for example, the case of the display information shown in FIG. 9), the rotation information operation unit 207 determines that the display information is displayed on the landscape screen, and control is passed to step S706. Then, it instructs the rotation unit 204 to rotate the display information by 90° or 270° in the buffer A.

In step S705, when the screen height for the display information is longer than the short side of the display area of the LCD 205 (for example, the case of the display information shown in FIG. 10), the rotation information operation unit 207 passes control to step S707 without rotating the display information.

In step S707, the rotation unit 204 combines the display information in the buffers A and B on the basis of the priority. In the present embodiment, the display information in the buffer B is combined as a higher order layer while the display information in the buffer A is combined as a lower order layer. Then, control is passed to step S708, and the rotation process is terminated (control is passed to step S608).

FIG. 8 shows an example of display when the screen width of the display information is equal to or shorter than the short side of the display area of the LCD 205, that is, when the entire image can be displayed in a normal position on either the portrait screen or the landscape screen.

(1) shows the display information in the buffer A. The display information is displayed in the program display area a of 240 dots long and 240 dots wide. On the other hand, the display area of the LCD 205 according to the present embodiment is 320 dots long and 240 dots wide. Therefore, the long side of the program display area a is equal to or shorter than the short side of the display area of the LCD 205.

(2) shows the display of the LCD 205 as a portrait screen. The portrait screen can display the entire display information on the LCD 205 without rotating the display information in the buffer A.

(3) shows the display of the LCD 205 as a landscape screen. The landscape screen can display the entire display information on the LCD 205 by rotating the display information in the buffer A by 270° (90°).

Figure 9:
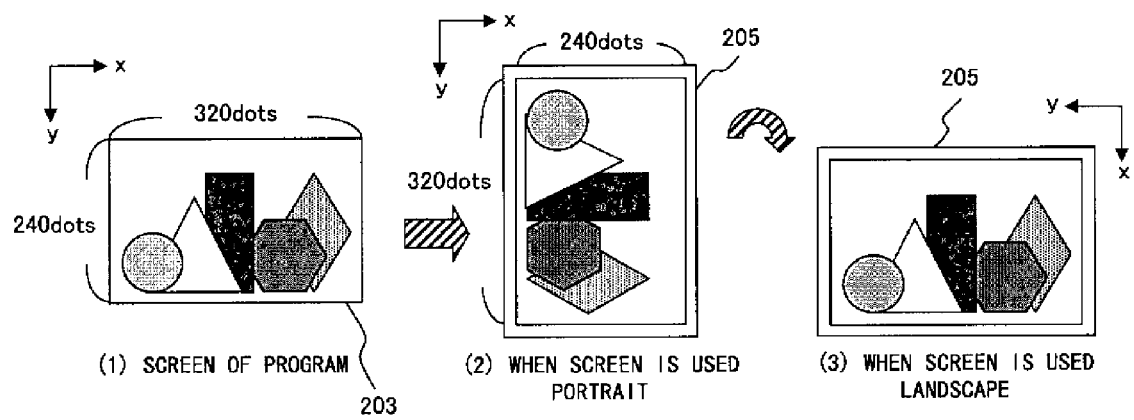
FIG. 9 shows an example of the display when the screen width of a program display area is longer than the short side of the display area of the LCD.

FIG. 9 shows an example of display when the screen width of the display information is longer than the short side of the display area of the LCD 205, that is, when the entire image can be displayed on either the portrait screen or the landscape screen by rotating the display information in the buffer A.

(1) shows the display information in the buffer A. The display information is displayed in the program display area a of 240 dots long and 320 dots wide.

(2) shows the display of the LCD 205 as a portrait screen. Since the display area of the LCD 205 according to the present embodiment is 320 dots long and 240 dots wide, the entire display information can be displayed on the LCD 205 by rotating the display information in the buffer A by 90°.

(3) shows the display of the LCD 205 as a landscape screen. Since the LCD 205 shown in (3) is obtained by rotating by only 90° clockwise the LCD 205 shown in (2), the entire display information can be displayed on the LCD 205 by rotating the display information in the buffer A by 270°.

Figure 10:
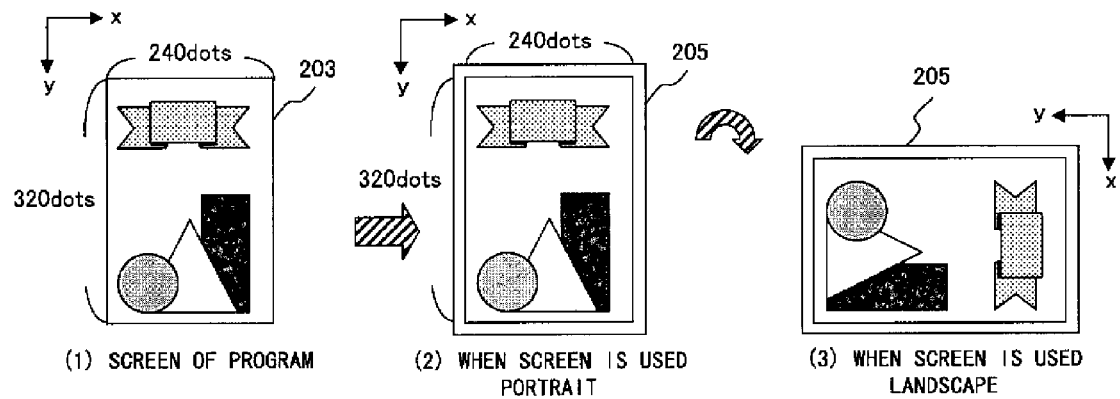
FIG. 10 shows an example of the display when the screen height of a program display area is longer than the short side of the display area of the LCD.

FIG. 10 shows an example of display when the screen height of the display information is longer than the short side of the display area of the LCD 205, that is, when the entire image can be displayed on either the portrait screen or the landscape screen without rotating the display information in the buffer A.

(1) shows the display information in the buffer A. The display information is displayed in the program display area a of 320 dots long and 240 dots wide.

(2) shows the display of the LCD 205 as a portrait screen. Since the display area of the LCD 205 according to the present embodiment is 320 dots long and 240 dots wide, the entire display information can be displayed on the LCD 205 without rotating the display information in the buffer A.

(3) shows the display of the LCD 205 as a landscape screen. Since the LCD 205 shown in (3) is obtained by rotating by only 90° clockwise the LCD 205 shown in (2), the entire display information can be displayed on the LCD 205 without rotating the display information in the buffer A.

FIG. 11 shows an example of the display of a list of programs by the list display unit 210 according to the embodiment of the present invention.

In the programs 1 to 5 shown in FIG. 11, the programs 1, 2, and 5 generate the display information to be displayed on a portrait screen, and the programs 2 and 3 generate the display information on the landscape screen. It is obvious that the number of programs etc. is not limited to the case shown in FIG. 11.

A display screen 1101 shows a list of programs displayed on a portrait screen. On the portrait screen, the list display unit 210 highlights only the programs 1, 2, and 5 for generating the display information to be displayed on a portrait screen.

A display screen 1102 shows a list of programs displayed on a landscape screen. On the landscape screen, the list display unit 210 highlights only the programs 3 and 4 for generating the display information to be displayed on a landscape screen.

Figure 12:
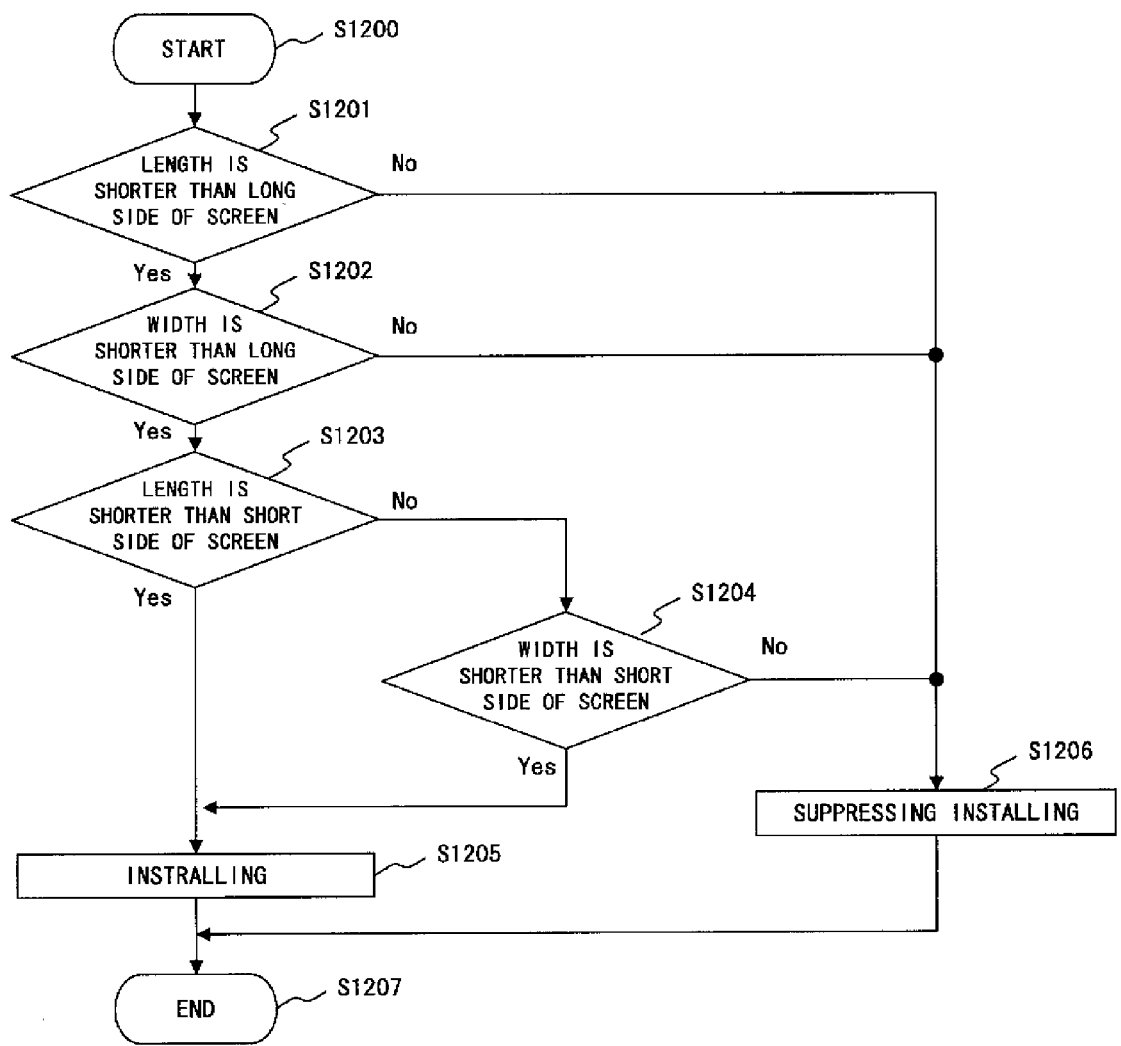
FIG. 12 is a flowchart of the installing process of the program in the mobile terminal apparatus according to an embodiment of the present invention.

FIG. 12 is a flowchart showing the installing process of the program in the mobile terminal apparatus 100 according to an embodiment of the present invention.

In a predetermined operation, when the installing process of a program (hereinafter the program to be installed is referred to as an "object program") is started, the mobile terminal apparatus 100 passes control to step S1201.

In step S1201, the mobile terminal apparatus 100 refers to the program execution information attached to the object program, and acquires the size of the program display area of the object program.

The mobile terminal apparatus 100 compares the screen height of the program display area with the long side of the display area of the LCD 205. If the screen height is longer than the long side of the display area of the LCD 205, control is passed to step S1206 to suppress the installing process.

If the screen height is equal to or shorter than the long side of the display area of the LCD 205, the mobile terminal apparatus 100 passes control to step S1202.

In step S1202, the mobile terminal apparatus 100 compares the screen width acquired in step S1201 with the long side of the display area of the LCD 205. If the screen width is longer than the long side of the display area of the LCD 205, then control is passed to step S1206, and the installing process is suppressed.

In step S1202, when the screen width is equal to or shorter than the long side of the display area of the LCD 205, the mobile terminal apparatus 100 passes control to step S1203, and compares the screen height acquired in step S1201 with the short side of the display area of the LCD 205.

If the screen height is longer than the short side of the display area of the LCD 205, then control is passed to step S1204. If the screen height is equal to or shorter than the short side of the display area of the LCD 205, then control is passed to step S1205.

In step S1204, the mobile terminal apparatus 100 compares the screen width acquired in step S1201 with the short side of the display area of the LCD 205. If the screen width is equal to or longer than the short side of the display area of the LCD 205, control is passed to step S1206 to suppress the installing process. In step S1204, if the screen width is equal to or shorter than the short side of the display area of the LCD 205, control is passed to step S1205, and the object program is installed. The installing process according to the present embodiment is a common process in which an object program can be operated on the OS for controlling the mobile terminal apparatus 100 by storing the object program in a predetermined storage device and performing predetermined settings. Therefore, detailed descriptions are omitted here.

When the object program is completely installed, the mobile terminal apparatus 100 passes control to step S1207, thereby terminates the process.

In the process above, the installing process on the programs other than the program for generating the display information shown in FIGS. 8 through 10 can be suppressed.

The process described above can be applied also when the program execution information is changed during execution of a program. That is, in step S1205, a change of program execution information can be reflected, and the change of the program execution information can be suppressed in step S1206.

Thus, the generation of the display information other than the display information shown in FIGS. 8 through 10 can be suppressed.

As described above, the mobile terminal apparatus 100 according to the present embodiment can realize the display shown in FIGS. 8 and 9 on the basis of the size of the display information generated by executing a program (size of a program display area), and the display screen direction of the LCD 205. As a result, the optimum display screen can be obtained on the basis of the size of the display information (size of the program display area) and the display screen direction of the LCD 205 without applying a special improvement to the program.

Furthermore, although the size of the program display area is changed during the execution of the program, the rotation information operation unit 207 changes the size of the screen buffer 203. Therefore, the size of the program display area can be dynamically changed.

Furthermore, although the size of the program display area is dynamically changed, the display shown in FIGS. 8 and 9 can be realized on the basis of the size of the display information generated by executing a program (size of the program display area) and the display screen direction of the LCD 205. That is, although the program display area is dynamically changed, the optimum display screen can be obtained on the basis of the size of the display information (size of the program display area) and the display screen direction of the LCD 205 without adding a special process to the program.

What is claimed is:

1. A mobile terminal apparatus to which a display unit for displaying desired display information is connected as a rotatable unit, comprising:
    a program execution unit executing a desired program, and storing, in a display information storage unit, display information output as a result of the executing;
    a direction detection unit detecting a direction of the display unit with respect to a body of the mobile terminal apparatus;
    a display information conversion unit rotating the display information stored in the display information storage unit in a desired direction on a basis of the direction of the display unit detected by the direction detection unit, and the size of the display information generated by the program; and
    a display processing unit reading the display information from the display information storage unit and outputting the display information to the display unit.

2. The apparatus according to claim 1, wherein
    the display information conversion unit compares a size of display information generated by the program with a size of the display unit, and rotates the display information such that an entire image can be displayed in a normal position on the display unit when the display information can be included in a display area of a maximum square included in the display unit.

3. The apparatus according to claim 2, wherein the display information conversion unit rotates the display information such that entire display information can be displayed on the display unit in a normal position when a long side of the display information is equal to or shorter than the short side of the display unit.

4. The apparatus according to claim 1, wherein the display information conversion unit compares a size of the display information generated by the program with a size of the display unit, and rotates the information such that entire display information can be displayed on the display unit.

5. The apparatus according to claim 4, wherein the display information conversion unit rotates the display by 90° or 270° information when a width of the display information is longer than a short side of the display unit.

6. The apparatus according to claim 4, wherein the display information conversion unit does not rotate the display information when a length of the display information is longer than a short side of the display unit.

7. The apparatus according to claim 1, wherein: the display information to be displayed in the display area is stored for each display area forming the display unit; and the display processing unit combines each piece of display information on a basis of a priority predetermined for each display area, and outputs a result to the display unit.

8. The apparatus according to claim 1, wherein when the display information conversion unit detects a change in size of the display information output by executing the program, the unit rotates in a desired direction the display information stored in the display information storage unit on a basis of a size of the changed display information and a direction of the display unit detected by the direction detection unit.

9. The apparatus according to claim 8, wherein when a length and a width of the changed display information are longer than a short side of the display unit, or when one of the length or the width of the changed display information is longer than a long side of the display unit, the change is suppressed.

10. The apparatus according to claim 1, wherein when a size of the display information output by executing a program to be installed is acquired from the program or a program execution information in which or an execution condition of the program is defined, and a length and a width of the display information are longer than a short side of the display unit, or one of the length or the width of the display information is longer than a long side of the display unit, an installing process of the program is suppressed.

11. The apparatus according to claim 1, wherein if a shortcut key is registered when the display unit is a portrait screen, a program assigned to the shortcut key generates display information that can be displayed on a portrait screen, and if a shortcut key is registered when the display unit is a landscape screen, a program assigned to the shortcut key generates display information that can be displayed on a landscape screen.

12. The apparatus according to claim 1, wherein if the display unit is a portrait screen, a list of programs for generating display information that can be entirely displayed in a normal position on the portrait screen is displayed, and if the display unit is a landscape screen, a list of programs for generating display information that can be entirely displayed in a normal position on the landscape screen is displayed.

13. A display method for displaying desired display information on a display unit connected to a mobile terminal apparatus as a rotatable unit, comprising:
a program executing process of executing a desired program, and storing, in a display information storage unit, display information output as a result of the executing;
a direction detecting process of detecting a direction of the display unit with respect to a body of the mobile terminal apparatus;
a display information converting process of rotating the display information stored in the display information storage unit in a desired direction on a basis of the detected direction of the display unit, and the size of the display information generated by the program; and
a display process of reading the display information from the display information storage unit and outputting the display information to the display unit.

14. The method according to claim 13, wherein the display information converting process compares a size of display information generated by the program with a size of the display unit, and rotates the display information such that an entire image can be displayed in a normal position on the display unit when the display information can be included in a display area of a maximum square included in the display unit.

15. The method according to claim 13, wherein the display information converting process compares a size of the display information generated by the program with a size of the display unit, and rotates the information such that entire display information can be displayed on the display unit.

16. The method according to claim 13, wherein the display information to be displayed in the display area is stored for each display area forming the display unit; and the display process combines each piece of display information on a basis of a priority predetermined for each display area, and outputs a result to the display unit.

17. A storage medium storing a program for displaying desired display information on a display unit connected to a mobile terminal apparatus as a rotatable unit, and used to direct a mobile terminal apparatus to perform the processes comprising:
a program executing process of executing a desired program, and storing, in a display information storage unit, display information output as a result of the executing;
a direction detecting process of detecting a direction of the display unit with respect to a body of the mobile terminal apparatus;
a display information converting process of rotating the display information stored in the display information storage unit in a desired direction on a basis of the detected direction of the display unit, and the size of the display information generated by the program; and
a display process of reading the display information from the display information storage unit and outputting the display information to the display unit.

18. The storage medium storing the program according to claim 17, wherein the display information converting process compares a size of display information generated by the program with a size of the display unit, and rotates the display information such that an entire image can be displayed in a normal position on the display unit when the display information can be included in a display area of a maximum square included in the display unit.

19. The storage medium storing the program according to claim 17, wherein the display information converting process compares a size of the display information generated by the program with a size of the display unit, and rotates the information such that entire display information can be displayed on the display unit.

20. The storage medium storing the program according to claim 17, wherein the display information to be displayed in the display area is stored for each display area forming the display unit; and the display process combines each piece of display information on a basis of a priority predetermined for each display area, and outputs a result to the display unit.

* * * * *